United States Patent [19]

Okuyama et al.

[11] Patent Number: 5,403,117
[45] Date of Patent: Apr. 4, 1995

[54] PAVEMENT, A PAVING MATERIAL AND METHODS OF PRODUCING SAID PAVEMENT AND SAID PAVING MATERIAL

[75] Inventors: Hideyuki Okuyama, Akashi; Tetsuya Kojimoto, Nagaokakyo; Masakazu Tanaka, Akashi, all of Japan

[73] Assignee: Sumitomo Rubber Industries, Ltd., Kobe, Japan

[21] Appl. No.: 163,545

[22] Filed: Dec. 9, 1993

[30] Foreign Application Priority Data

Apr. 9, 1992 [JP] Japan .................. 4-089072

[51] Int. Cl.$^6$ .................................... C08K 9/08
[52] U.S. Cl. ...................... 404/34; 260/998.19; 524/584
[58] Field of Search ............ 404/17, 28, 29, 30, 404/32, 34, 72, 75; 428/489; 524/59, 68, 584; 260/998.19

[56] References Cited

U.S. PATENT DOCUMENTS

| | | | |
|---|---|---|---|
| 3,070,557 | 12/1962 | Gessler et al. | 404/17 X |
| 4,000,095 | 12/1976 | Van Den Berg | 404/17 X |
| 4,028,293 | 6/1977 | Van Den Berg | 404/17 X |
| 4,132,701 | 1/1979 | Tapis | 260/42 |
| 4,744,693 | 5/1988 | Smith | 404/77 |
| 5,221,702 | 6/1993 | Richards | 524/59 |

FOREIGN PATENT DOCUMENTS

| | | | |
|---|---|---|---|
| 2658212 | 8/1991 | France | 404/17 |
| 2549794 | 5/1976 | Germany | 524/59 |
| 0036548 | 4/1981 | Japan | 524/59 |
| 1052921 | 12/1981 | Japan | 524/68 |
| 3-043502 | 2/1991 | Japan | 404/17 |

*Primary Examiner*—Ramon S. Britts
*Assistant Examiner*—James A. Lisehora
*Attorney, Agent, or Firm*—Nikaido, Marmelstein, Murray & Oram

[57] ABSTRACT

The present invention provides pavement and a paving material in which a large quantity of aggregates are bound with one another by a hot melt of thermoplastic resin powder, and also provides producing methods of such pavement and such paving material. The thermoplastic resin powder is neither limited in pot life, nor influenced by working conditions and weather conditions at the time when pavement is laid at a job site. Accordingly, uniform strength can be given to the resulting pavement or paving material. Further, the resulting pavement or paving material is excellent in weather resistance, elasticity and flexibility. Thus, the pavement of the present invention can be suitably used as pavement at play ground, parks, roads and the like. It is also easy to amend pavement, as necessary, after laid. The pavement producing method of the present invention can readily and efficiently produce the pavement.

5 Claims, 5 Drawing Sheets

PAVEMENT, A PAVING MATERIAL AND METHODS OF PRODUCING SAID PAVEMENT AND SAID PAVING MATERIAL

CROSS RELATED APPLICATION

This application is a continuation of International Application No. PCT/JP93/00282, which was filed on Mar. 5, 1993.

1. Technical Field

The present invention relates to (i) pavement which is laid on play grounds, parks, roads and the like and in which a large quantity of aggregates are bound with one another by resin, (ii) paving materials which form the pavement and each of which has a predetermined block or sheet shape, and (iii) methods of producing these pavement and paving materials.

2. Background Art

Conventionally, such pavement may be laid by a so-called job-site executing method by which a mixture obtained by mixing hard aggregates such as natural stone or the like, or elastic soft aggregates such as rubber chips or the like with liquidous hardening resin, is applied to a job site where the hardening resin is then hardened. Also, such pavement may be laid by spreading, over a job site, paving materials each previously obtained at a factory by charging a mold with the mixture above-mentioned, of which hardening resin is then hardened, each paving material having a predetermined block or sheet shape. Such conventional pavement using hardening resin presents the following problems regardless of the executing method:

1) The hardening resin is low in working efficiency in that it is limited in a period of time, i.e., a so-called pot life, during which the hardening reaction starts and proceeds until the flowability of the resin is lost. More specifically, the hardening resin starts a hardening reaction immediately after a hardening agent is blended or after the application of humidity, heat or the like which accelerates the hardening reaction. It is therefore not possible to preserve the raw materials in the form of a mixture for a long period of time. Further, the liquidous hardening resin as hardened sticks to machines, tools and the like used at the time of mixing, execution of pavement and the like. Accordingly, it is required to frequently wash such machines, tools and the like. Further, after the hardening resin has been hardened, the resulting pavement or paving material can be hardly changed. Accordingly, it is disadvantageously required to finish all necessary works before the hardening reaction proceeds to cause the flowability to be lost.

2) To obtain a predetermined strength, a hardened body of hardening resin requires a long-time curing even after the resin has been hardened. During such curing, the completed pavement cannot be used. In the particular case of at-site execution, this involves the likelihood that the pavement under curing is an obstacle to other works. When using block- or sheet-like paving materials, it is required to take a sufficient care of movement and transportation of the product blocks or sheets until such blocks or sheets are fully cured so that a predetermined strength is given thereto. This is disadvantageous in view of productivity.

3) When producing paving material blocks or sheets at a factory, a hot-press molding is executed to accelerate the hardening reaction of the hardening resin. The productivity largely depends on the pressing time. The use of a hot-press molding greatly reduces the time of hardening reaction as compared with the case where the resin is hardened at ambient temperature. However, it still takes a relatively long period of time before the hardening reaction is complete. Accordingly, it has to be said that such a hot-press molding is not fully effective. Further, when a hot-press molding is applied, the heat generated at the hot-press molding lowers the viscosity of the hardening resin to cause the same to readily flow. Accordingly, the hardening resin is accumulated at the lower part of pavement or each paving material. Thus, there is formed uneven pavement or an uneven paving material containing the hardened body of hardening resin in a greater amount at the lower part thereof and in a smaller amount at the upper part thereof. Further, a hot-press molding requiring large-scale facilities is disadvantageous in view of the cost of equipment.

4) Hardening resin once hardened cannot be brought again into a flowable state and is poor in compatibility with other material. Accordingly, the hardened body cannot be readjusted or repaired at a broken portion thereof if any. Even though such a broken portion can be repaired, it means that aggregates or the like are newly added. Accordingly, the repaired part presents a different color and therefore becomes striking.

5) Since the hardening resin contains a hardening agent, a crosslinking agent, an organic solvent and the like, the hardening resin presents strong toxicity and offensive smell. This is harmful to the health of workers.

6) The degree of hardening reaction of hardening resin varies with conditions. Accordingly, the strength of the resulting pavement may greatly vary with the conditions of operations such as mixing, stirring, executing, molding and the like, and the weather conditions such as temperature, humidity and the like at the time of execution of pavement, molding and curing.

7) Prevailing hardening resin is a one-can humidity-hardening-type urethane polymer made from, for example, toluene diisocyanate (TDI), diphenyl methane diisocyanate (MDI) or the like. Such hardening resin is liable to be yellowed or made fragile by light. Accordingly, such hardening resin often produces a hardened body which is poor in weather resistance, elasticity and flexibility.

8) It is difficult to uniformly stir solid aggregates and liquidous hardening resin. This involves the likelihood that the resulting pavement presents portions containing many aggregates and portions containing less aggregates. Further, a mixture of aggregates and hardening resin is highly viscous and muddy. This particularly makes it difficult to automatically pour the mixture into a mold when producing blocks or sheets at a factory. Accordingly, such pouring is disadvantageously manually conducted.

It is an object of the present invention to provide novel pavement and a novel paving material without the use of hardening resin presenting a variety of problems above-mentioned, and methods of efficiently producing such pavement and such a paving material.

Disclosure of the Invention

The present invention provides pavement in which a large quantity of aggregates are bound with one another by a hot melt of thermoplastic resin powder mixed with the aggregates.

The present invention provides a pavement producing method comprising the steps of: heating a mixture of aggregates with thermoplastic resin powder in an amount sufficient to bind the aggregates with one another when heated and molten, thereby to melt the thermoplastic resin powder; and cooling a molten mixture to produce the pavement above-mentioned.

The present invention provides a paving material in which a large quantity of aggregates are bound with one another by a hot melt of thermoplastic resin powder mixed with the aggregates, the paving material being molded in a predetermined shape.

The present invention provides a paving material producing method comprising the steps of: charging a mold frame with a mixture of aggregates with thermoplastic resin powder in an amount sufficient to bind the aggregates with one another when heated and molten; heating the mold frame to melt the thermoplastic resin powder; and molding a molten mixture by a cold-press molding, thereby to produce the paving material above-mentioned.

According to present invention, the pavement, the paving material and the pavement/paving material producing methods above-mentioned, the thermoplastic resin powder is used for binding the aggregates. Accordingly, there is no limit in pot life as done in hardening resin. This enables the thermoplastic resin powder and the aggregates to be preserved in the form of a mixture for a long period of time. Further, such a mixture is not liable to be hardened as sticked to machines and tools under use. This substantially eliminates the need to wash the machines and tools. Further, the thermoplastic resin once molded can be again molten merely by heating the same. Accordingly, the thermoplastic resin is excellent in working efficiency in that the working time can be extended as necessary and that the pavement once laid can be readily changed. Further, even though the mutual joint of the aggregates is imperfect at the time of primary molding, the aggregates can be again bound by heating again the thermoplastic resin. Also, pavement or a paving material which has been partially broken, can be repaired by heating such a broken part with the use of an iron or the like.

Further, when cooled below the melting point, the thermoplastic resin is immediately solidified to present a predetermined strength. This is advantageous in that curing or the like is not required and that the production time can be reduced. When time and temperature are taken into consideration, the thermoplastic resin serving as a binder is not vertically unevenly dispersed in the resulting pavement or paving material as happens in the hardening resin.

The thermoplastic resin containing no toxic components such as a hardening agent or the like, is excellent in safety. Further, the thermoplastic resin is not solidified according to a complicate hardening reaction, but is solidified according to a physical change in phase from a liquidous phase to a solid phase. Thus, there can be obtained pavement or a paving material having a predetermined strength at all times which is not influenced by ambient conditions.

By properly selecting the type of thermoplastic resin, it is possible to provide elasticity, flexibility and weather resistance which are superior to a hardened body of hardening resin. Further, such characteristics can be further improved by blending a variety of additives such as a plasticizer, a stabilizer and the like.

The thermoplastic resin and the aggregates can be uniformly mixed with each other merely by applying vibration thereto, without the use of a powerful stirrer such as a rotary mixer, a universal stirrer or the like. Further, even though allowed to stand in the form of a mixture, the aggregates and the thermoplastic resin are not separated from each other. Accordingly, there can be obtained pavement and a paving material in which the aggregates have been uniformly dispersed.

The paving material of the present invention can be mass-produced at a factory. Accordingly, pavement can be laid merely by spreading, over a job site, such mass-produced paving materials. This further simplifies the work of execution at a job site.

According to the paving material producing method of the present invention, a molten mixture of the aggregates with the thermoplastic resin powder is forcibly cooled by a cold-press molding. This shortens the production time as compared with the case where a molten mixture is naturally cooled. Further, the time of a cold-press molding is considerably shorter than the time of a hot-press molding required for hardening hardenable resin. This remarkably improves the productivity.

Further, the cold-press molding does not require such large-scale facilities as are required for a hot-press molding, but can be realized by a simple arrangement for passing cooling water through press molds. Accordingly, there are required, as facilities for producing the paving material, only cold-press molding means and heating means for melting the thermoplastic resin powder. Thus, the paving material can be advantageously produced with simple facilities.

A liquidous mixture of hardening resin and aggregates is highly viscous as mentioned earlier, and is required to be manually poured in a mold. On the other hand, a mixture of thermoplastic resin powder and aggregates is not viscous at all, but is in the form of particles. This enables such a mixture to be readily poured in the mold. It is therefore possible to automatically charge the mold with the mixture, thus further improving productivity of the paving material production processes.

BEST MODE FOR CARRYING OUT THE INVENTION

The following description will discuss in more detail the present invention with reference to the attached drawings.

Figure 1A:
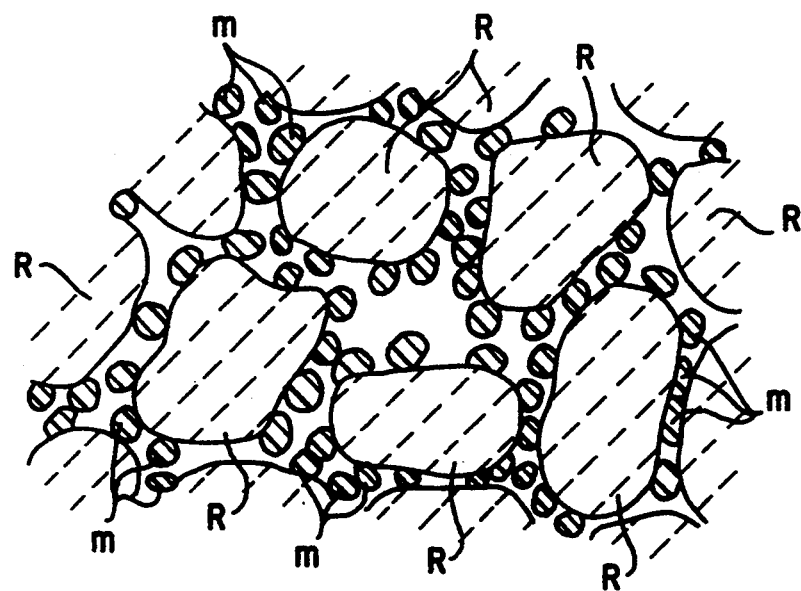
FIG. 1 (a) is an enlarged section view of a mixture of aggregates and thermoplastic resin powder, to be used in each of methods of producing pavement and a paving material according to the present invention, and FIG. 1 (b) is an enlarged section view of the structure of each of pavement and a paving material according to the present invention, as obtained by heating mixture above-mentioned.
Figure 1B:
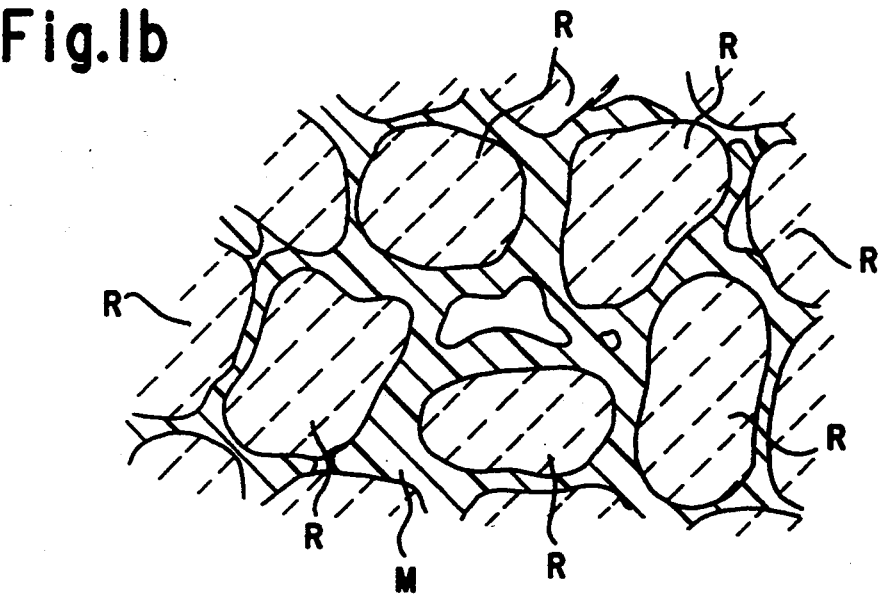

As shown in FIG. 1 (b), pavement of the present invention is formed by binding a large quantity of aggregates R with one another by a hot melt M of thermoplastic resin.

As shown in FIG. 1 (a), the pavement is produced by a method of the present invention comprising heating a mixture of a large quantity of aggregates R with thermoplastic resin powder m, causing the thermoplastic resin powder m to be molten.

The mixture can be heated under pressure as necessary. When the mixture is heated under pressure, there can be obtained pavement of which void volume is small and of which density is high. Further, the adjustment of the pressing force enables the pavement to be controlled in void volume and density. Further, the pavement obtained after heated can be forcibly cooled, as mentioned earlier. In such a case, the production time can be further reduced.

As a method of laying pavement on a job site, there may be employed a direct executing method by which a mixture of aggregates with thermoplastic resin powder is scattered, through a primer layer or the like as necessary, on the surface of concrete pavement, asphalt pavement or the like at a job site, and then heated with the use of a hot platen or the like, or by which a previously heated mixture is put down on the surface of concrete pavement, asphalt pavement or the like, and then rolled. However, there is preferably used an indirect executing method of spreading, over a job site, block- or sheet-like paving materials produced at a factory or the like by the paving material producing method of the present invention.

Figure 2:
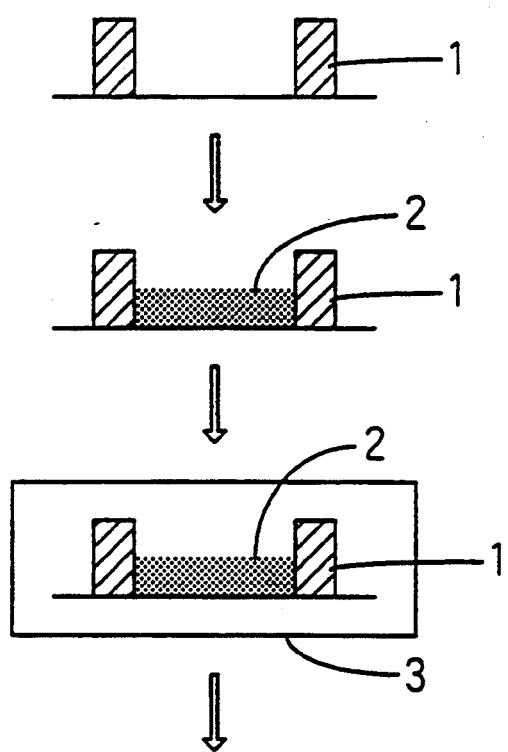
FIG. 2 is a view of a step of heating and melting mixture, in the paving material producing method according to the present invention.

FIG. 2 shows a specific example of the paving material producing method. As shown in FIG. 2, a primary mold frame 1 is charged with a mixture 2 of aggregates with thermoplastic resin powder.

Both the aggregates and the thermoplastic resin powder are solid. Accordingly, without the use of a powerful stirrer such as a universal stirrer or the like, the aggregates and the thermoplastic resin powder can be sufficiently mixed with each other such that the aggregates are sufficiently covered with the thermoplastic resin powder, by putting the aggregates and the thermoplastic resin powder in a container such as a wash bowl or the like and by vibrating the container with the hand.

When charging the primary mold frame with the mixture, the mold frame can be vibrated such that the mixture is uniformly dispersed in the mold frame.

The primary mold frame 1 charged with the mixture 2 is put and heated in an oven 3, causing the thermoplastic resin powder to be molten.

According to the present invention, no particular restrictions are imposed on the heating temperature and time. However, if the heating temperature is too low, the viscosity of the molten resin becomes high. This possibly prevents the molten resin from being spread throughout the aggregates. On the contrary, if the heating temperature is too high, the resin and the aggregates might be decomposed. If the heating time is too short, this possibly prevents the molten resin from being spread throughout the aggregates. If the heating time is too long, the resin and the aggregates might be decomposed. Thus, the heating temperature and time are desirably set, according to the type of thermoplastic resin to be used, to optimum ranges in which the problems above-mentioned do not occur.

Figure 3:
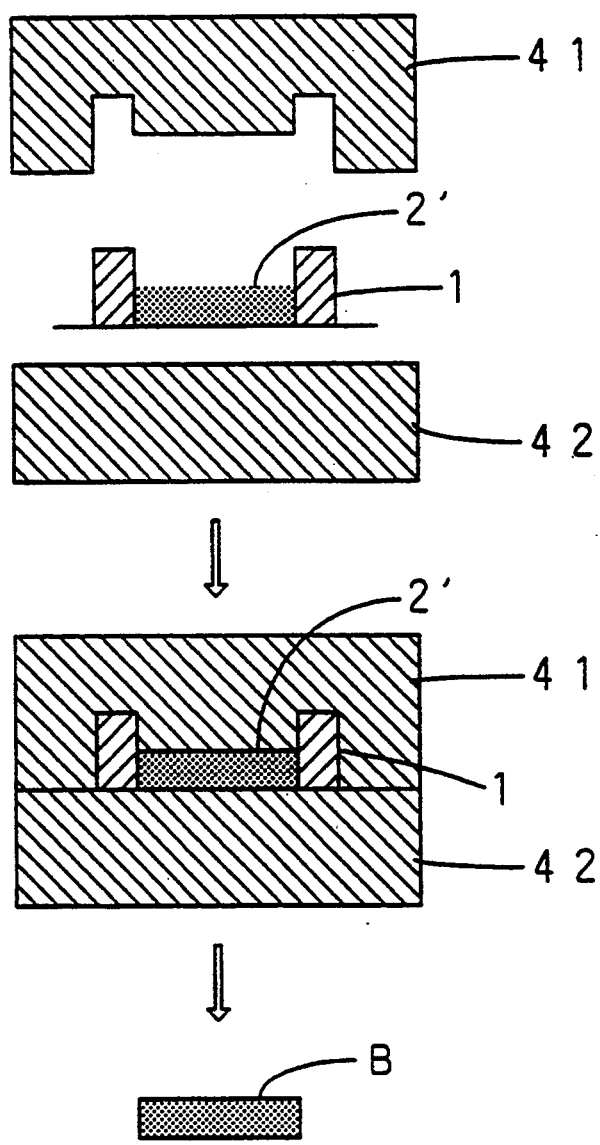
FIG. 3 a view of a step of cooling and pressing a molten mixture, in the paving material producing method according to the present invention.

Then, the primary mold frame 1 is removed from the oven 3. As shown in FIG. 3, the primary mold frame 1 together with a molten mixture 2' in which the thermoplastic resin powder has been heatingly molten and spread throughout the aggregates, is set to a pair of upper and lower secondary mold frames 41, 42 and subjected to a cold-press molding. When the molten mixture 2' is sufficiently cooled, a paving material B can be obtained.

To cool the secondary mold frames 41, 42, there may be used a direct cooling method by which cooling water passes through the inside of the secondary mold frames 41, 42, or an indirect cooling method by which the secondary mold frames 41, 42 previously cooled before they are used, are used for a cold-press molding.

To further improve the productivity of such a paving material, the primary mold frame 1 may be preferably made of a material of which thermal capacity is small and of which thermal conductivity is great, and the secondary mold frames 41, 42 may be preferably made of a material liable to absorb heat.

Pavement materials which have been produced, in the form of blocks, by the producing method above-mentioned, may be placed and laid on concrete pavement, asphalt pavement, gravel or the like at a job site, directly or as adhered to the surfaces of concrete blocks. When produced in the form of sheets, such paving materials may be adhered to the surface of concrete pavement, asphalt pavement or the like through a primer layer or the like as necessary.

As the aggregates, there may be used a variety of conventional hard and soft aggregates.

As the soft aggregates, there may be used a variety of soft aggregates having elasticity such as rubber chips, urethane chips, waste tire rubber chips, cork, soft waste plastic chips and the like crushed in the form of cords or particles each having a particle size of, for example, about 0.05 mm to about 30 mm. The hardness of the soft aggregates is not limited to a specific value, but is preferably not greater than 70 as the JIS [Japanese Industrial Standards] A hardness in order to assure the elasticity of the resulting pavement.

As the hard aggregates, there may be suitably used natural stone, wood pieces, walnut pieces, bamboo pieces, shell pieces, ceramic particles, hard plastic particles, hard plastic crushed pieces and the like in the form of particles of which particle sizes are in the range from 0.05 to 30 mm and of which hardness is not less than 30 as the JIS D hardness. Hard aggregates such as natural stone which are difficult to mix with thermoplastic resin powder, may be preferably used as treated at the surfaces thereof with, for example, epoxy resin or the like, but may also be used as they are.

As the thermoplastic resin powder, there may be particularly suitably used, as selected from a variety of conventional types of thermoplastic resin powder, thermoplastic resin powder having a melting point of 60° to 200° C. and the average particle size of not greater than 10 mesh. In particular, soft thermoplastic resin powder excellent in weather resistance and water resistance is preferable.

If the melting point of the thermoplastic resin powder is lower than 60° C., the thermoplastic resin in the finished pavement is in danger of being melted by direct rays of the sun particularly in summer, causing the pavement to be deformed. On the contrary, if the melting point exceeds 200° C., this not only makes it difficult to melt the thermoplastic resin powder at the time of execution of pavement, but also involves the likelihood that the heat generated at the melting time will deteriorate the aggregates. Particularly, aggregates having rubber-like elasticity and hard aggregates of hard plastics may also be deteriorated.

To prevent the thermoplastic resin from being again melted by direct rays of the sun or the like sufficient to cause the pavement to be deformed, the Vicar softening point of the thermoplastic resin is preferably not lower than 40° C.

The average particle size of the thermoplastic resin powder is preferably not greater than 10 mesh for the following reason.

If the average particle size of the thermoplastic resin powder exceeds 10 mesh, the aggregates are poorly bound with one another so that the resulting paving material or pavement becomes very fragile, unless the aggregates are mixed with such thermoplastic resin powder in a molten condition after being previously heated to a certain degree. It is therefore required to heat, before molding or execution of pavement, a mixture of the aggregates with thermoplastic resin powder with the use of large-scale facilities such as a heating and mixing machine.

On the other hand, if the average particle size of the thermoplastic resin powder is not greater than 10 mesh, the thermoplastic resin powder which has even not been previously heated, enables the aggregates to be satisfactorily bound with one another, providing pavement which is excellent in strength. This is therefore advantageous in view of production in that the aggregates can be readily mixed without the use of a large-scale machine such as a heating and mixing machine.

It is noted that, when there is available, at a factory, previously heating and mixing facilities such as a heating and mixing machine, no particular restrictions are imposed on the average particle size of the thermoplastic resin powder.

Examples of preferable thermoplastic resin powder include (i) powder of soft thermoplastic resin including poly (meth)acrylates such as ethyl methyl acrylate (EMA) and the like, polyethylene (PE), polypropylene (PP), polyvinyl chloride (PVC), polyurethane, an ethylene-vinyl acetate copolymer (EVA), an ethylene-ethyl acrylate copolymer (EEA) and the like, and (ii) powder of thermoplastic rubber including butadiene rubber, ethylene-propylene rubber (EPM), ethylene-propylene-diene rubber (EPDM), styrene-butadiene rubber (SBR), nitrile rubber (NBR), olefin rubber, polyester rubber and the like.

The blending amount of the thermoplastic resin powder is not limited to a specific value, but is preferably in the range from 3 to 50% by volume based on the total amount of the aggregates.

If the blending ratio of the thermoplastic resin powder is less than 3% by volume, the resulting pavement is possibly poor in strength. On the contrary, if the blending ratio exceeds 50% by volume, there is a possibility of the pavement being covered at its surface with a layer of thermoplastic resin powder binder. This may not only lower the skid-proof and shock-absorbing function of the aggregates, but also injure the appearance of the pavement.

According to the present invention, when the blending ratio of the thermoplastic resin powder is set to a smaller value within the range above-mentioned, there can be formed pavement having water permeability. In such a case, the void volume of the resulting pavement is preferably in the range from 10 to 40%.

If the void volume of the pavement is less than 10%, the water permeability might be insufficient. On the contrary, if the void volume exceeds 40%, the pavement is lowered in strength.

It is preferred to properly select a combination of the type of aggregates with the type of thermoplastic resin powder, according to the chemical compatibility of the both types in addition to the characteristics of the pavement to be produced. For example, when chips of ethylene-propylene-diene rubber are used as the aggregates, there is suitably used, as the thermoplastic resin powder, an ethylene-vinyl acetate copolymer, soft polyethylene or butadiene rubber which the same backbone chain of repeating methylene units, which is able to stick to the surfaces of the aggregates when mixed therewith, which can be readily uniformly mixed with the aggregates, and which presents a high adhesion strength after heating and melting.

Industrial Applicability

In the pavement according to the present invention, thermoplastic resin powder is used for binding the particles with one another, thus overcoming the problems caused at the time when hardening resin is used. That is, the pavement of the present invention has uniform strength which does not vary with working conditions and weather conditions at the time of execution of pavement. Further, the pavement of the present invention is excellent in weather resistance, elasticity and flexibility, and can be readily repaired or amended after executed. Thus, the pavement can be suitably used as pavement for play grounds, parks, roads and the like.

According to the pavement producing method of the present invention, the pavement having the excellent characteristics above-mentioned can be more readily produced.

The paving material of the present invention can be mass-produced at a factory. Accordingly, pavement can be laid merely by spreading, over a job site, such mass-produced paving materials. This further simplifies the work of execution at a job site.

According to the paving material producing method of the present invention, a molten mixture of aggregates and thermoplastic resin powder is forcibly cooled by a cold-press molding, enabling the productivity to be further improved.

EXAMPLES

The following will discuss in detail the present invention with reference to examples thereof and comparative examples. However, the present invention is not limited to these examples only.

Example 1

A pad was charged with 300 g of chips of ethylene-propylene-diene rubber (average particle size of 2.5 mm, "GRIPCOAT GO CHIP" manufactured by Sumitomo Rubber Industries, Ltd.) and with 60 g of powder of an ethylene-vinyl acetate copolymer (average particle size of 40 meshes, the concentration of vinyl acetate of 25% by weight, the melt flow rate of 3 g/10 min.). The pad was vibrated with the hand to mix the chips with the powder for one minute. This produced a mixture in which the chips of ethylene-propylene-diene rubber and the powder of an ethylene-vinyl acetate copolymer were uniformly mixed with each other.

A mold having a length of 200 mm, a width of 200 mm and a depth of 10 mm was charged with the mixture. The mold together with the mixture was heated, for 15 minutes, in an oven heated to 200° C. Thereafter, the contents were removed from the mold and then allowed to stand for cooling, thus producing a sheet-like paving material. The void volume of this paving material was 32% as obtained from the volume thereof, the specific gravity of the ethylene-propylene-diene rubber (d=1.3) as a raw material and the specific gravity of the ethylene-vinyl acetate copolymer (d=0.9) as a raw material.

Comparative Example 1

With the use of a universal stirrer, a mixture was obtained by stirring and mixing 260 g of chips of ethylene-propylene-diene rubber and 37 g of MDI-type one-can humidity-hardening-type urethane resin ("GRIPCOAT C-928" manufactured by Sumitomo Rubber Industries, Ltd.).

A mold having a length of 190 mm, a width 190 mm and a depth of 10 mm was charged with the resulting mixture. The mixture was sufficiently pressed and spread in the mold with a trowel. The mold together with the mixture was put in an oven and then heated and pressed, for 20 minutes, in an oven heated to 150° C. Thereafter, the contents were removed from the mold and then allowed to stand for cooling, thus producing a sheet-like paving material. The void volume of this paving material was 33% as obtained from the volume thereof, the specific gravity of the ethylene-propylene-diene rubber (d=1.3) as a raw material and the specific gravity of the hardened body of the hardening resin (d=0.9) as a raw material.

Each of the sheet-like paving materials of Example 1 and Comparative Example 1, was punched in the form of a dumbbell. According to the method of tensile test stipulated by JIS K6301, each of these dumbbell-like samples was measured for tensile strength $T_B$ [Kgf/cm$^2$] and extensibility $E_B$ (%) immediately after molded, and every 24 hours up to 72 hours after molded.

Figure 4:
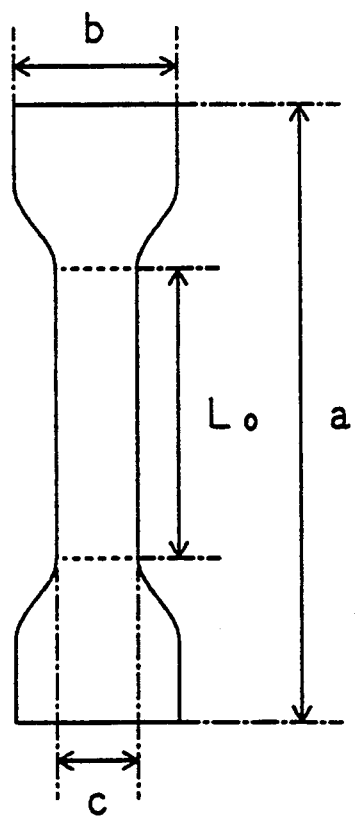
FIG. 4 is a plan view of a dumbbell-like sample prepared from an example of the paving material according to the present invention, the sample being prepared for; measuring the tensile strength and extensibility thereof

More specifically, there was attached, to a specimen grip of a tensile test machine, each dumbbell-like sample having an entire length a of 120 mm, a width b of 25 mm, a center parallel-portion width c of 10 mm, and a parallel-portion length or bench-mark length $L_0$ of 40 mm, as shown in FIG. 4. There was read the maximum load $F_B$ [kgf{N}] with which each sample was finally broken when pulled at a tensile speed of 500±25 mm/min. With the use of each value thus read and the section area A (cm$^2$) of each sample, the tensile strength $T_B$ [Kgf/cm$^2$] was calculated according to the following equation;

$$T_B = F_B/A$$

Each at-break bench-mark length $L_1$ (mm) was measured. With the use of each value thus measured and the bench-mark length $L_0$=40 mm before the tensile test was conducted, each extensibility $E_B$ (%) was calculated according to the following equation:

$$E_B = (L_1 - L_0)/L_0$$

The results are shown in Table 1.

TABLE 1

|  | Example 1 | | Comparative Example 1 | |
|---|---|---|---|---|
|  | Tensile Strength [Kgf/cm$^2$] | Extensibility (%) | Tensile Strength [Kgf/cm$^2$] | Extensibility (%) |
| Immediately after molded | 9.7 | 96 | 0.1 | 2 |
| After 24 hrs. | 9.7 | 96 | 4.0 | 32 |
| After 48 hrs. | 9.8 | 98 | 7.0 | 50 |
| After 72 hrs. | 9.7 | 100 | 7.1 | 55 |

From the results in Table 1, it is understood that the tensile strength of Comparative Example 1 was remarkably low at the point of time immediately after molded, and finally increased to 7.0 [Kgf/cm$^2$] after 48 hours of curing, but could not be increased more. The extensibility of Comparative Example 1 underwent a change at a low level from the point of time immediately after molded, to the point of time after the passage of 72 hours. Accordingly, it was found that Comparative Example 1 using hardening resin, was required to be cured for a long period of time after molded, and could not produce pavement excellent in elasticity or the like.

On the other hand, it was found that Example 1 presented high values of tensile strength and extensibility from the point of time immediately after molded, and these values did not change with the passage of time thereafter.

Examples 2 to 4

Each mixing container was charged with each of the combinations, shown in Table 2, of aggregates and EVA powder ("FLOVAC-MK-2010" manufactured by Sumitomo Seika Chemicals Co., Ltd.) serving as thermoplastic resin powder. Each container was vibrated to produce a uniform mixture. Chips of EPDM rubber ("GRIPCOAT GO CHIP" manufactured by Sumitomo Rubber Industries, Ltd.) was used as soft aggregates in Table 2, and natural stone ("MAMEJYARI" dealt by Sumitomo Rubber Industries, Ltd.) was used as hard aggregates in Table 2. Each mixing ratio of the total amount of aggregates to the EVA powder was 5:1 in terms of volume.

TABLE 2

|  | Aggregates (g) | | |
|---|---|---|---|
|  | Soft Aggregates | Hard Aggregates | EVA Powder (g) |
| Example 2 | 137 | — | 19 |
| Example 3 | 69 | 124 | 19 |
| Example 4 | — | 243 | 19 |

As shown in FIG. 2, each primary mold frame 1 having a length of 130 mm, a width of 130 mm and a depth of 10 mm was charged with each mixture 2. Each mold was vibrated to cause the mixture to be uniformly spread therein. Each mixture together with the primary mold frame 1 was heated for 15 minutes in an oven 3 heated to 180° C.

Thereafter, each primary mold frame 1 together with a molten mixture 2' was taken out from the oven 3, and then set to a pair of secondary mold frames 41, 42 which had been sufficiently cooled (the weight of the upper secondary mold frame 41 was 50 kgs.). Thus, each molten mixture 2' was subjected to a cold-press molding under a pressure of 0.3 Kg/cm² for 10 minutes, thus forming a sheet-like paving material B.

The void volume of each paving material was 25% as obtained from the volume thereof, the specific gravity of the ethylene-propylene-diene rubber (d=1.3) as a raw material, the specific gravity of the ethylene-vinyl acetate copolymer (d=0.9) as a raw material and the specific gravity of natural stone (d=2.3) as a raw material.

Comparative Example 2

With the use of a universal stirrer, a mixture was obtained by stirring and mixing 822 g of chips of EPDM rubber and 87 g of MDI-type one-can humidity-hardening-type urethane resin. A mold frame having a length of 300 mm, a width of 300 mm and a depth of 10 mm was charged with the mixture. The mixture was sufficiently pressed and spread in the mold with a trowel. The mold frame was set to a hot-press molding machine and subjected to a hot-press molding under a pressure of 1.0 Kg/cm² at 150° C. for 20 minutes, thus producing a sheet-like paving material. The void volume of this paving material was 25 as obtained from the volume thereof, the specific gravity of the ethylene-propylene-diene rubber (d=1.3) as a raw material and the specific gravity of the hardened body of the hardening resin (d=0.9) as a raw material.

The following tests were conducted on each of the sheet-like paving materials of Examples 2 to 4 and Comparative Example 2 for evaluating the characteristics thereof.

Test of Tensile Strength

Each of the sheet-like paving materials of Examples 2 to 4 and Comparative Example 2 was punched in the form of a dumbbell. According to the method of tensile test stipulated in JIS K6301, each of these dumbbell-like samples was measured for tensile strength [Kgf/cm²] and extensibility (%) immediately after molded, and every 24 hours up to 72 hours after molded.

Evaluation of Workability

As parameters presenting the easiness of paving material producing operations, the easiness of stirring and the easiness of charging a mold with raw materials, were evaluated in the following five grades by the workers who had actually taken part in production operations.
Easy: 5 points
Relatively easy: 4 points
Ordinary: 3 points
Relatively difficult: 2 points
Difficult: 1 point
Further, the following comments were given by the workers about the stirring and charging operations.

Easiness of stirring: In Comparative Example 2, there were mixed two components different in phase, i.e., particles of the EPDM rubber chips and a liquid of MDI-type one-can humidity-hardening-type urethane resin. It was therefore difficult to uniformly mix these components. In each of Examples 2 to 4, there were mixed substances in the same solid phase, i.e., aggregates particles and EVA powder, enabling these substances to be readily mixed with each other.

Easiness of charging: In Comparative Example 2, the mixture was muddy, causing the same to be spread in the mold with difficulty. In Examples 2 to 4, each mixture was in the form of dry powder, enabling the same to be readily spread in the mold.

Measurement of Working Periods of Time

There were measured the periods of time of the following steps out of the paving material producing operations:

Stirring Time: As to each of Examples 2 to 4, there was measured a period of time during which each mixing container as charged with the aggregates and the EVA powder, was vibrated until there was produced a uniform mixture. As to Comparative Example 2, there was measured a period of time during which the chips of EPDM rubber and the MDI-type one-can humidity-hardening-type urethane resin were stirred with a universal stirring machine until there was produced a uniform muddy mixture.

Charging Time: There was measured a period of time during which each mold frame was completely charged with each of the mixtures of the same amount.

Pressing Time: As to each of Examples 2 to 4, there was measured a period of time during which each molten mixture was cooled to room temperature. As to Comparative Example 2, there was measured a period of time during which the MDI-type one-can humidity-hardening-type urethane resin was sufficiently heated and hardened.

In view of the following points, there was evaluated the working efficiency with which each of the paving materials of Examples 2 to 4 and Comparative Example 2, was produced.

Available Time: Comparative Example 2 was limited in the available time [pot life] of the MDI-type one-can humidity-hardening-type urethane resin (30 minutes), but none of Examples 2 to 4 was limited in available time.

Curing Time: Even after hardened, Comparative Example 2 was required to be cured for about 48 hours in order to obtain sufficient strength, while none of Examples 2 to 4 was required to be cured.

Toxicity: Comparative Example 2 using the MDI-type one-can humidity-hardening-type urethane resin is toxic, while Examples 2 to 4 containing no toxic components are not toxic.

The results are shown in Tables 3 and 4.

TABLE 3

| | Tensile Strength [Kgf/cm²] | Extensibility (%) | Evaluation of Working Efficiency | | |
|---|---|---|---|---|---|
| | | | Stirring | Charging | Total |
| Example 2 | 9.7 | 96 | 5 points | 4 points | 9 points |
| Comparative Example 2 | 7.0 | 50 | 2 points | 2 points | 4 points |
| Example | 6.0 | 50 | 5 points | 4 points | 9 points |

TABLE 3-continued

|  | Tensile Strength [Kgf/cm²] | Extensibility (%) | Evaluation of Working Efficiency | | |
| --- | --- | --- | --- | --- | --- |
|  |  |  | Stirring | Charging | Total |
| Example 3 | | | | | |
| Example 4 | 5.5 | 20 | 5 points | 4 points | 9 points |

TABLE 4

| | Stirring Time (sec) | Charging Time (sec) | Pressing Time (min) | Available Time (min) | Curing Time (hour) | Toxicity |
| --- | --- | --- | --- | --- | --- | --- |
| Example 2 | 20 | 27 | 10 | No limit | Not necessary | None |
| Comparative Example 2 | 160 | 95 | 20 | 40 | 48 | Present |
| Example 3 | 20 | 27 | 10 | No limit | Not necessary | None |
| Example 4 | 20 | 27 | 10 | No limit | Not necessary | None |

From the results in Tables 3 and 4, it was found that any of Examples 2 to 4 was superior in working efficiency to Comparative Example 2, and could be produced in a short period of time. From the results of Example 2 and Comparative Example 2 both using the same soft aggregates, it was found that Example 2 presented higher tensile strength and higher extensibility.

Test of Weather Resistance

Each of the paving materials of Example 2 and Comparative Example 2 both using the same soft aggregates, was deteriorated as exposed to UV ray with the use of a sunshine weatherometer. The degree of color change in each paving material with the passage of time, was evaluated in terms of color difference $\Delta E^*ab$ representing the amount of change in color value $(L^*a^*b^*)$ as measured with a color difference meter (CR310 manufactured by Minolta Camera Co., Ltd.). As a color difference $\Delta E^*ab$ is greater, the degree of color change becomes greater which represents a faster deterioration. The results are shown in FIG. 5.

Figure 5:
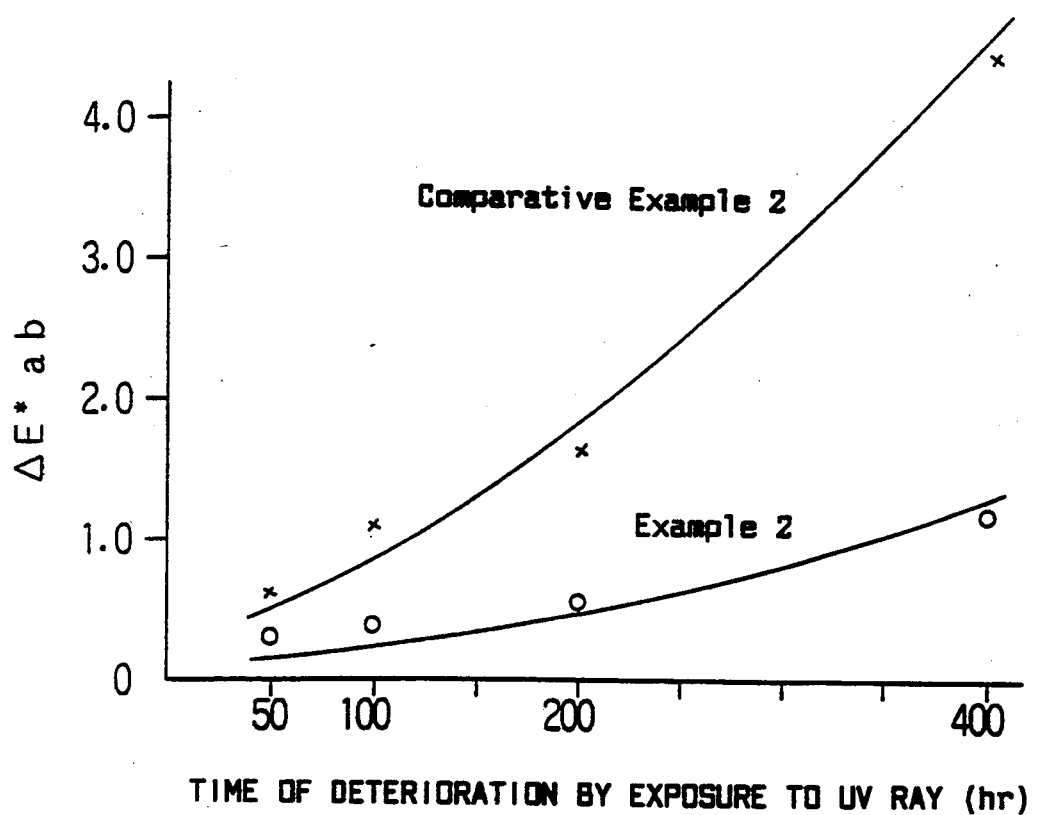
FIG. 5 is a graph illustrating the results of evaluation, in terms of color difference, of the weather resistance of each of an example of the paving material according to the present invention and a comparative example, such weather resistance being obtained by an UV ray deterioration test.

From the results in FIG. 5, it was found that Example 2 was superior in weather resistance in Comparative Example 2.

What is claimed is:

1. In the method of producing a shaped article suitable for use as a block for forming a paving which comprises:
   admixing a binder with particulate aggregate;
   filling a mold with said admixture;
   pressing said admixture in said mold to form said block shaped article;
   cooling said shaped article sufficient to retain its molded block shape; and
   removing said formed cooled block shaped article from said mold;
   the improvement which comprises:
   providing said binder as a solid thermoplastic resin powder;
   admixing said particulate aggregate with said solid resin powder in an amount such that, upon being melted, said thermoplastic resin will bind said aggregate into a cohesive shape;
   filling said mixture of solid aggregate and solid binder into a mold frame;
   melting said thermoplastic resin powder in said mold frame sufficient for said molten resin to wet said aggregate to form a partially melted admixture;
   force cooling said partially melted admixture in said mold frame sufficient to substantially solidify said melted resin in wetting contact with said aggregate, by contacting such with cold pressing means, to form a preliminary molded shape;
   cold pressing said forcible cooled preliminary molded shape into the shape and size of said block shaped article; and
   removing said block shaped article from said mold frame.

2. A method of producing a shaped article according to claim 1, wherein the aggregates have a particle size of about 0.05 to 30 mm, and the thermoplastic resin power, before being heated and melted, has a particle size of not greater than about 10 mesh.

3. A paving material producing method according to claim 1, wherein the thermoplastic resin powder presents a melting point in the range from 60° to 200° C. and a Vicat softening point of not less than 40° C.

4. A paving material producing method according to claim 1, wherein the blending ratio of the thermoplastic resin powder to the total amount of the aggregates, is in the range from 30 to 50% by volume.

5. The product of the method of claim 1.

* * * * *

UNITED STATES PATENT AND TRADEMARK OFFICE
CERTIFICATE OF CORRECTION

PATENT NO. : 5,403,117
DATED : April 4, 1995
INVENTOR(S) : OKUYAMA et al.

It is certified that error appears in the above-indentified patent and that said Letters Patent is hereby corrected as shown below:

ON THE TITLE PAGE:

Insert —Item [63] Related U.S. Application Data:
Continuation of PCT/JP39/00282, Filed March 5, 1993.—.

Signed and Sealed this

Eleventh Day of June, 1996

Attest:

BRUCE LEHMAN

Attesting Officer     Commissioner of Patents and Trademarks